US012726438B2

(12) United States Patent
Fultaria et al.

(10) Patent No.: US 12,726,438 B2
(45) Date of Patent: Sep. 1, 2026

(54) SIDEBAND SERIALIZATION OF LINKS OF NETWORK-ON-CHIP

(71) Applicant: Baya Systems, Inc., Santa Clara, CA (US)

(72) Inventors: Jatinkumar Vithalbhai Fultaria, Bengaluru (IN); Avinash Jagdish Patil, Bangalore (IN); Om Prakash Hari, Bengaluru (IN); Joji Philip, San Jose, CA (US)

(73) Assignee: BAYA SYSTEMS, INC., Santa Clara, CA (US)

( * ) Notice: Subject to any disclaimer, the term of this patent is extended or adjusted under 35 U.S.C. 154(b) by 113 days.

(21) Appl. No.: 18/793,016

(22) Filed: Aug. 2, 2024

(65) Prior Publication Data

US 2025/0392544 A1 Dec. 25, 2025

(30) Foreign Application Priority Data

Jun. 19, 2024 (IN) ............................. 202411047140

(51) Int. Cl.
*H04L 45/76* (2022.01)
*H04L 45/74* (2022.01)
*H04L 49/109* (2022.01)

(52) U.S. Cl.
CPC ............ *H04L 45/74* (2013.01); *H04L 49/109* (2013.01)

(58) Field of Classification Search
CPC .............................. H04L 45/74; H04L 49/109
See application file for complete search history.

(56) References Cited

U.S. PATENT DOCUMENTS

2019/0266088 A1* 8/2019 Kumar ................ G06F 15/7825
2019/0363829 A1* 11/2019 Tune ....................... H04L 45/28
2022/0360540 A1* 11/2022 Brewer ................. H04L 69/321

FOREIGN PATENT DOCUMENTS

CN 111131091 B * 5/2021 ........... H04L 49/109

* cited by examiner

*Primary Examiner* — Tan Doan
(74) *Attorney, Agent, or Firm* — Procopio, Cory, Hargreaves & Savitch LLP

(57) ABSTRACT

A Network on Chip (NoC) includes a serializer connected to a transport link/channel. The serializer is configured to receive a flit composed of a header and a payload in parallel, forward the header to the transport link/channel, and forward the payload to the transport link/channel after the header has been sent/forwarded. The NoC also includes a deserializer connected to the transport link/channel of the NoC. The deserializer is configured to receive the header and the payload in a serialized manner from the transport link/channel, and send copies of the header and pass the payload in parallel to a physical output channel.

17 Claims, 6 Drawing Sheets

500B

SIDEBAND SERIALIZATION OF LINKS OF NETWORK-ON-CHIP

CROSS-REFERENCE TO RELATED APPLICATIONS

This application claims priority to IN 202411047140, filed on Jun. 19, 2024, the contents of which are incorporated herein by reference.

BACKGROUND

Technical Field

Methods and example embodiments described herein are generally directed to network-on-chip system interconnect architecture, and more specifically, to serialization of links.

Related Art

The number of components on a chip is rapidly growing due to increasing levels of integration, system complexity, and shrinking transistor geometry. Complex System-on-Chips (SoCs) may involve a variety of components e.g., processor cores, Digital Signal Processors (DSPs), hardware accelerators, memory, and Input/Output (I/O), while Chip Multi-Processors (CMPs) may involve a large number of homogenous processor cores, memory, and I/O subsystems. In both systems, the on-chip interconnect plays a key role in providing high-performance communication between the various components. Due to scalability limitations of traditional buses and crossbar-based interconnects, Network-on-Chip (NoC) has emerged as a paradigm for interconnecting a large number of components on the chip.

NoC is a global shared communication infrastructure made up of several routing nodes (also referenced to as routers) interconnected with each other using point-to-point physical links. The routers may be interconnected using at least one physical channel therebetween. Messages are injected by the source component and are routed from the source component to the destination component over multiple intermediate nodes and physical links. The messages are then ejected to the destination component. For the remainder of the document, terms 'processing elements,' 'components,' 'blocks,' 'hosts,' or 'cores' will be used interchangeably to refer to the various system components which are interconnected using a NoC. Terms 'routers' and 'nodes' will also be used interchangeably. Without loss of generalization, the system with multiple interconnected components will itself be referred to as 'multi-core system.'

There are several possible topologies in which the routers can connect to one another to create the system network. Bi-directional rings (as shown in FIG. 1(*a*)) and 2-D mesh (as shown in FIG. 1(*b*)) are examples of topologies in the related art. Each router may be associated with at least one of the components A to I.

Packets are message transport units for intercommunication between various components. Routing involves identifying a path which is a set of routers and physical links of the network over which packets are sent from a source to a destination. Components are connected to one or multiple ports of one or multiple routers; with each such port having a unique identifier (ID). Packets carry the destination's router and port ID for use by the intermediate routers to route the packet to the destination component.

Examples of routing techniques include deterministic routing, which involves choosing the same path from A to B for every packet. This form of routing is oblivious of the state of the network and does not load balance across path diversities which may exist in the underlying network. However, such deterministic routing may be simple to implement in hardware, maintains packet ordering, and may be easy to make free of network level deadlocks. Shortest path routing minimizes the latency as it reduces the number of hops from the source to the destination. For this reason, the shortest path is also the lowest power path for communication between the two components. Dimension-order routing is a form of deterministic shortest path routing in 2D mesh networks.

FIG. 2 illustrates an example of XY routing in a two dimensional mesh. More specifically, FIG. 2 illustrates XY routing from node '34' to node "00.' In the example of FIG. 2, each component is connected to only one port of one router. A packet is first routed in the X dimension till the packet reaches node '04' where the x dimension is same as destination. The packet is next routed in the Y dimension until the packet reaches the destination node.

Source routing and routing using tables are other routing options used in NoC. Adaptive routing can dynamically change the path taken between two points on the network based on the state of the network. This form of routing may be complex to analyze and implement, and is therefore rarely used in practice.

A NoC may contain multiple physical networks. Over each physical network, there may exist multiple virtual networks, where different message types are transmitted over different virtual networks. In this case, at each physical link or channel, there are multiple virtual channels (VCs); each VC may have dedicated buffers at both end points. In any given clock cycle, only one VC can transmit data on the physical channel.

NoC interconnects often employ wormhole routing, where a large message or packet is broken into small pieces known as flits (also referred to as flow control digits). The first flit is the header flit which holds information about this packet's route and key message level information along with payload data and sets up the routing behavior for all subsequent flits associated with the message. Zero or more body flits follow the head flit, containing the remaining payload of data. The final flit is tail flit which in addition to containing the last payload also performs some bookkeeping to close the connection for the message. In wormhole flow control, virtual channels are often implemented.

The physical channels are time sliced into a number of independent logical channels/VCs. VCs provide multiple independent paths to route packets; however, they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" refers to the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

As stated, the NoC interconnects may also employ source routing, i.e. where complete or partial routing information is provided by the source router in the route header/header flit. In such implementations, the routers interpret the routing information to transport the data packets from the source router to the destination router, with or without modifications to the routing path. In some implementations, several flits of the packets are transmitted between routers in parallel, based on the number of link/channels/wires available, and their corresponding capacities. While higher number of links or wires with higher capacities increase the bandwidth of the interconnects, they come at the cost of increased power consumption, complexity, manufacturing costs, and area consumed.

In some NoCs, the headers (such as route headers, packet headers, payload headers, and the like) may be sent in parallel with each payload flit. For example, headers may be sent alongside the payload flits in sideband wires of the NoCs. However, if the header is large, the bandwidth required to transport the payload along with the header requires transport links with higher capacities. It may also be redundant in some cases to transport the header with every payload flit. Thus, resulting in poor utilization of the dedicated wires provisioned to transport the header alongside the payload.

Hence, there is a need for a NoC that is capable of transporting header and payload flits through the transport links with reduced wires, and more efficiently.

SUMMARY

Aspects of the example implementations may include a Network on Chip (NoC). The NoC includes a serializer connected to a transport link/channel of the NoC. The serializer is configured to receive a flit composed of a header and a payload, forward the header to the transport link/channel, and forward the payload to the transport link/channel after the header is forwarded.

Aspects of the example implementation may also include an NoC having a deserializer connected to the transport link/channel of the NoC. The deserializer is configured to receive the header and the payload in a serialized manner from the transport link/channel, and send copies of the header and pass the payload through in parallel to a physical output channel.

BRIEF DESCRIPTION OF THE DRAWINGS

FIG. 5(*b*) illustrates a per-hop serialization-deserialization mode, in accordance with an example implementation.

DETAILED DESCRIPTION

In certain flow control implementation of Network-on-Chip (NoC), packets may be transported as multiple flits. Each of the flits may include one or more fields. In some examples, each flit of the packet may have a header and a payload associated therewith. The header may be at least one of including, but not limited to, router headers, packet headers, payload headers, and the like. Transporting header alongside the payload flits of the packet in parallel requires use of wider and/or multiple wires on a link/channel between two or more routers. However, the use of greater number of wires for transporting header in parallel increases the cost of the network. Embodiments described herein relate to serialization of flits having the header and the payload received in parallel, and transporting the serialized flits through a transport link. Further, the flits may be deserialized before they are ejected out from the transport link.

Figure 1A:
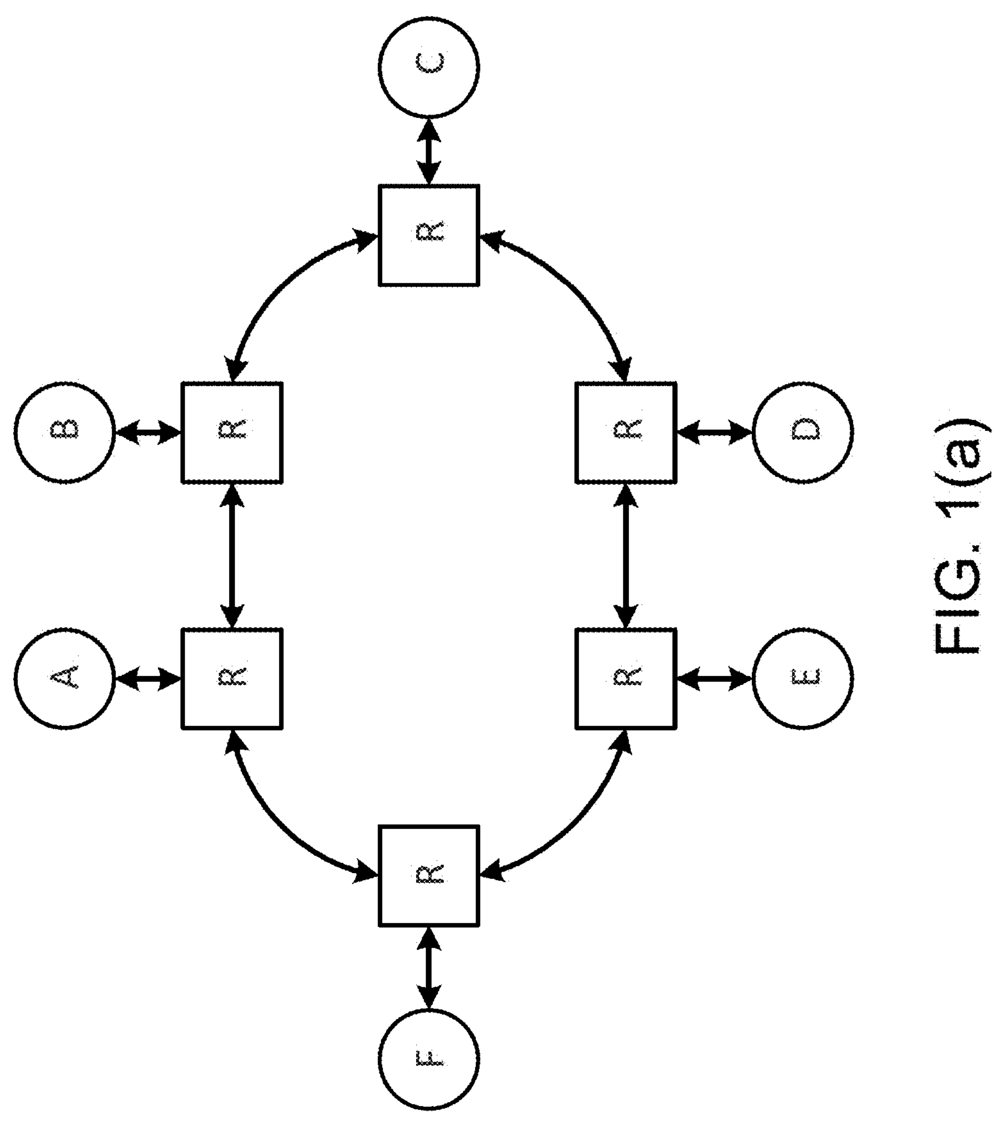
FIGS. 1(*a*) and 1(*b*) illustrate examples of Bi-directional ring and 2D Mesh Network on Chip (NoC) topologies.
Figure 1B:
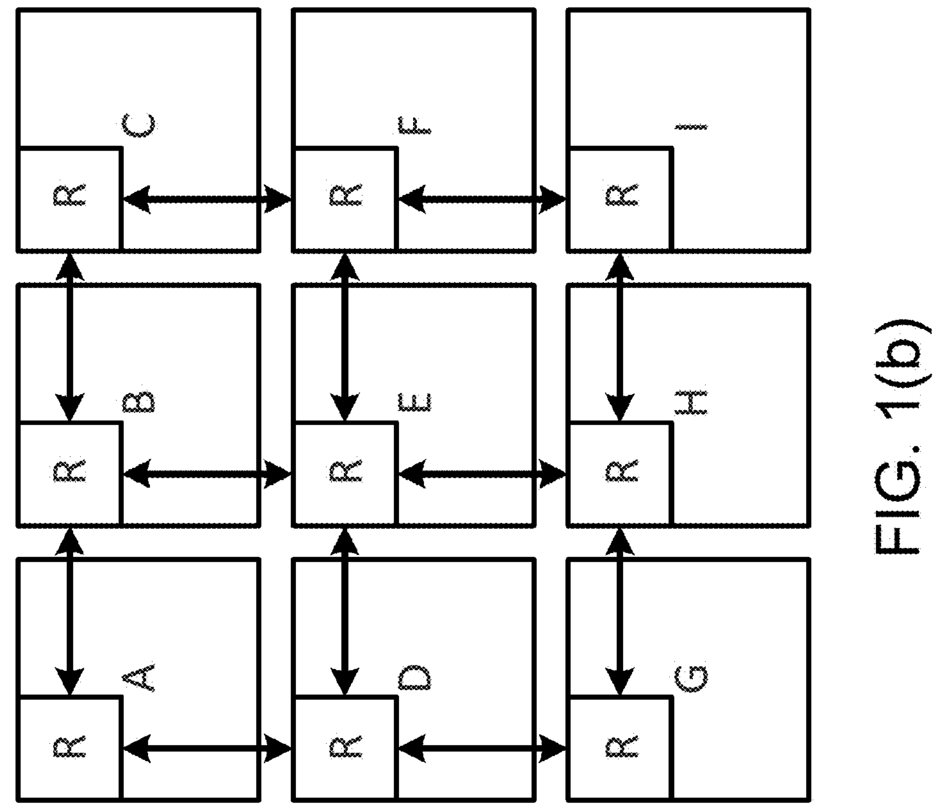
Figure 2:
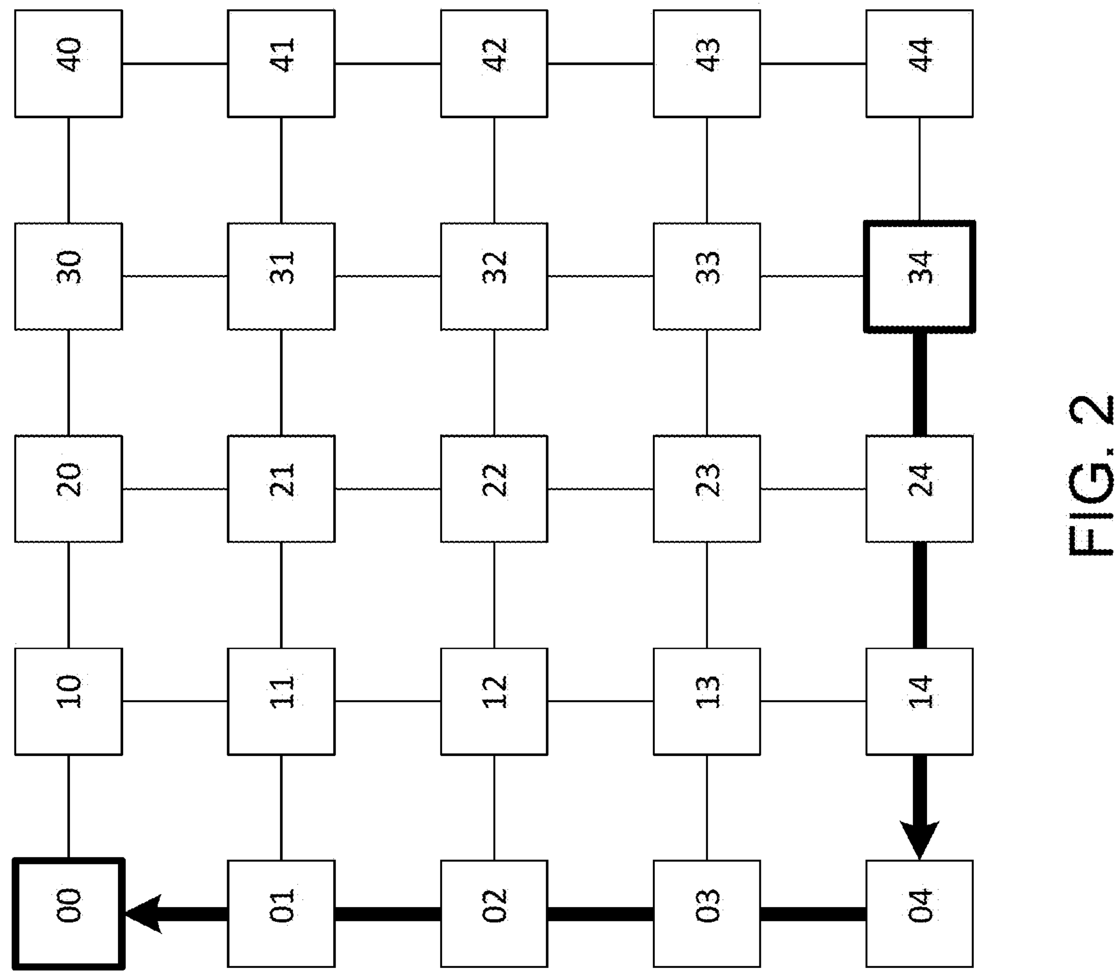
FIG. 2 illustrates an example of XY routing in a NoC having a two-dimensional mesh topology.
Figure 3:
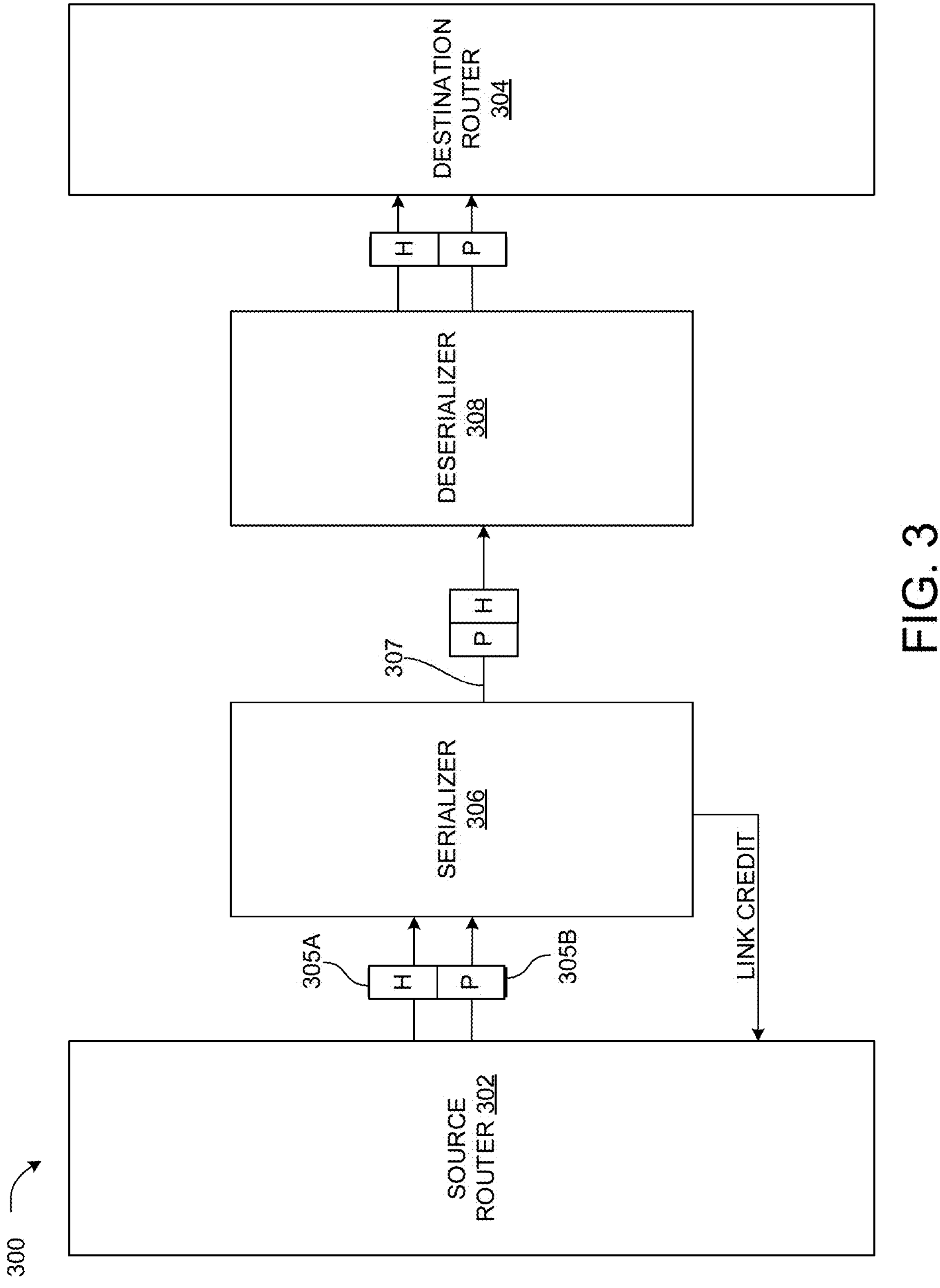
FIG. 3 illustrates a flit being transported on a NoC, in accordance with an example implementation.
Figure 4:
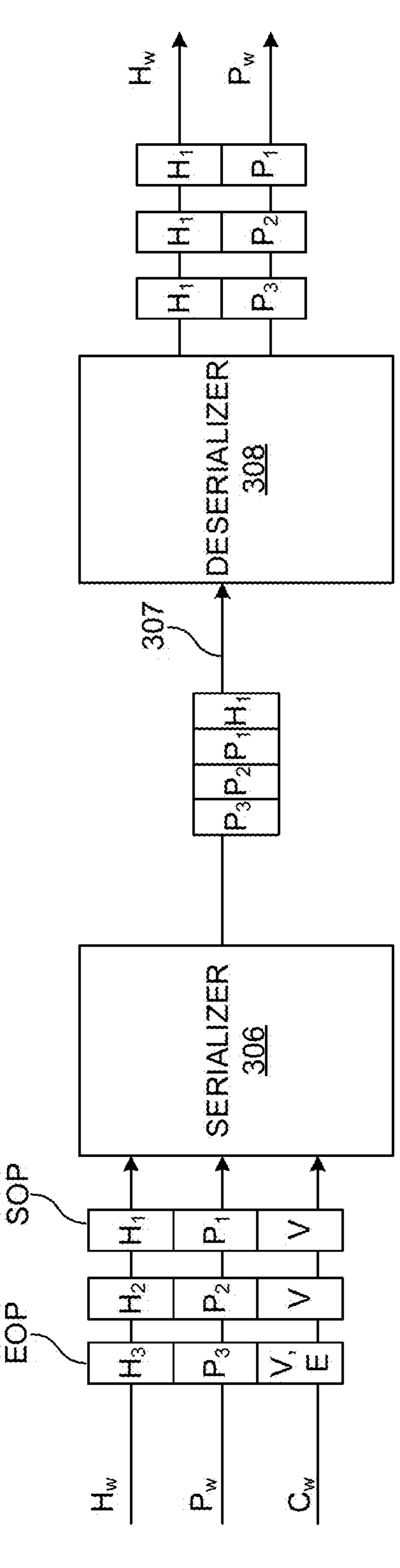
FIG. 4 illustrates multiple flits being transported through the NoC, in accordance with an example implementation.
Figure 5A:
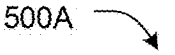
FIG. 5(*a*) illustrates an end-to-end serialization mode for the NoC, in accordance with an example implementation.
Figure 5A:
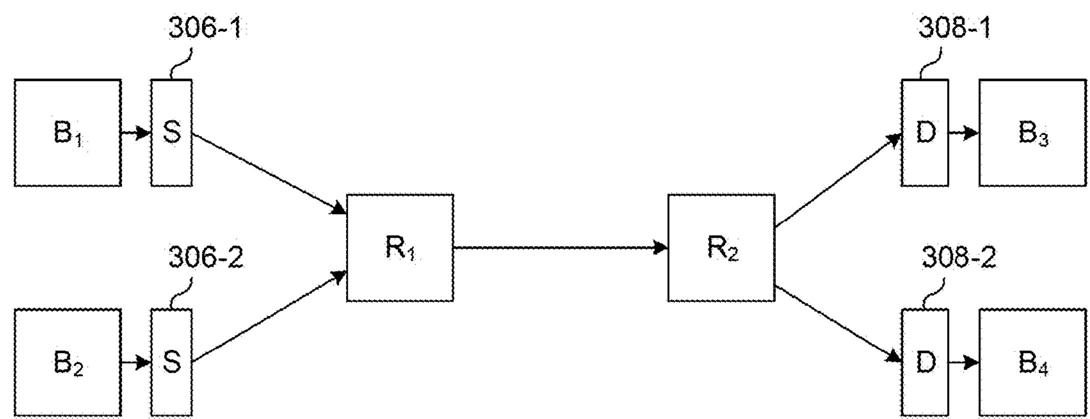
Figure 5B:
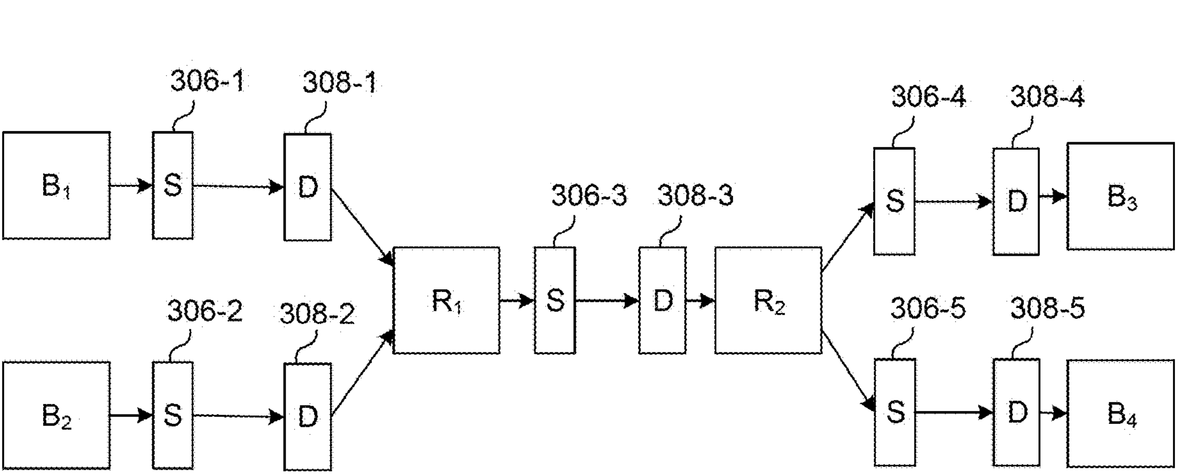

Various embodiments of the present disclosure are described in detail in refence to FIGS. 3 to 5(*b*).

FIG. 3 illustrates an example representation 300 a flit associated with a packet being transported through the NoC. The NoC may include a serializer 306 and a deserializer 308. In some embodiments, the serializer 306 and the deserializer 308 may be configured between a first router (such as source router 302) and a second router (such as a destination router 304). The first router may be connected to a source processing element that transmits packets therefrom, and the second router may be connected to a destination processing element that receives the packets from the source processing element for further processing. In other embodiments, the first and the second routers may be intermediary routers between the source router 302 and the destination router 304. In some embodiments, the serializer 306 may be connected to either the first router (such as the source router 302), or a bridge of the NoC, wherefrom the serializer 306 receives the packets. In yet other embodiments, the serializer 306 or the deserializer 308 may be directly connected to the processing elements. While the forthcoming embodiments are described in the context of the packets being transmitted between two routers, it may be appreciated by those skilled in the art that the packets may be transmitted between any of processing elements, routers, bridges, a deserializer, or other components of the NoC, through a transport link/channel 307.

The packets may be received in the form of one or more flits. The flits may be received by the serializer 306 with all its contents transported in parallel. In some embodiments, the serializer 306 may be connected to the transport link/channel 307 of the NoC, and may be configured to transmit flits therethrough. The serializer 306 may include a first-in-first-out (FIFO) buffer that receives and stores the flits from the first router (e.g., 302).

The serializer 306 may be configured to receive the flits from the first router. In some embodiments, each flit may have one or more fields, such as a header 305A (H) and a payload 305B (P). In such embodiments, the header 305A and the payload 305B of the flit may be received in parallel. The serializer 306 may be configured to forward the header 305A to the transport link/channel 307, and forward the payload 305B to the transport link/channel 307 after the header 305A is forwarded. In such embodiments, the header 305A and the payload 305B may be transmitted in a serialized manner, i.e. the header 305A followed by the payload 305B. In such embodiments, if the header 305A has a size greater than the capacity of the transport link 307, the header 305A may be split into multiple flits, which may be transported serially through the transport link 307. In such embodiments, the multiple flits associated with the header 305A may be transmitted serially through the transport link 307. Similarly, if any of the payload 305B is greater than the capacity of the transport link 307, the payload 305B may be split and transmitted through the transport link 307 through multiple flits.

The serializer 306 may be configured to forward the header 305A to the transport/link channel 307. The serializer 306 may forward the header 305A of each flit corresponding to a start of packet (SOP). In such embodiments, the serializer 306 may be configured to determine a portion (or a subset of bits) of the flit indicative of the header of the SOP, and may prioritize transmission of the determined portion to the deserializer 308. For flits subsequent to the SOP, the serializer 306 may drop header thereof, and serially the transmit the payload of the subsequent flits. In some embodiments, the SOP, or the determined portion thereof, may include routing information that may be used by the routers to route the packets to the destination processing element.

The serializer 306 may be configured to transmit the serialized flits, i.e. the header 305A followed by the payload 305B, through the transport link 307. The transport link 307 may be implemented as one or more wires. On either end, the transport link 307 may be connected to any of including, but not limited to, the serializer 306, the deserializer 308, routers, processing elements, bridges-to-router connections, and the like. The serialized flits transmitted through the transport link 307 may be ejected therefrom. In some embodiments, the serialized flits may be ejected to any one of the deserializer 308, the routers (such as the destination router 304), the processing elements, the bridges, or the like.

In some embodiments, the transport link 307 may be indicative of a physical link having one or more virtual channels (VCs). At least one of the wires from the transport link 307 corresponds to each of the VCs. In some embodiments, the transport link 307 may have separate wires dedicated to transmitting a predetermined field from the flits. In some examples, some wires may be dedicated for transmitting header 305A, while other wires may be dedicated to transmitting payload 305B, such as $H_w$ for transmitting header 305A and $P_w$ for transmitting payload 305B.

In some embodiments, the serializer 306 may manage multiple VCs associated with the transport link/channel 307. In such embodiments, the serializer 306 may be configured to forward the header 305A and the payload 305B to one of the multiple VCs associated with the transport link/channel 307. In some embodiments, the serializer 306 may be configured to forward the header 305A to the transport link/channel 307 by forwarding multiple portions of the header 305A sequentially to the transport link/channel 307. The serializer 306 may maintain a buffer corresponding to each of the VCs. The buffers may be used to receive flits associated with different packets, and allow for their serialization to the corresponding VCs.

In some embodiments, the serializer 306 may be configured to transmit the serialized flits to any one of including, but not limited to, the deserializer 308, routers, network interfaces of processing elements, and the like, through the transport link 307. Components or processing elements capable of natively handling serialized flits may receive and process the serialized flits transmitted through the transport link 307. Other components may receive the flits after deserialization/parallelization of the serialized flits.

In some embodiments, the deserializer 308 may be connected to the transport link/channel 307 of the NoC, or a bridge of the NoC. The deserializer 308 may be configured to receive the flits in a serialized manner from the transport link/channel 307. In some embodiments, the header 305A and the payload 305B received by the deserializer 308 may be transmitted through the transport link 307 by the serializer 306. In other embodiments, the header 305A and the payload 305B may be transmitted through the transport link 307 by any processing element of the NoC, which the deserializer 308 may receive and process for deserialization. The deserializer 308 may receive the serialized header 305A and the payload 305B, and store them in its buffer for parallelization/deserialization.

The deserializer 308 may send copies of the header 305A and pass the payload 305B in parallel to a physical output channel. By passing the payload 305B along with copies of the header 305A, the deserializer 308 may (re) parallelize the flits of the packets. In such embodiments, the flits of the packets, prior to serialization by the serializer 306, may be regenerated. In some embodiments, a physical output channel may be connected to a router, such as the destination router 304. In such embodiments, the deserializer 308 may allow the second router to interpret the parallelized flits in the manner they were transmitted from the first router. In some embodiments, the physical output channel may be connected to any one of the processing elements, another serializer, bridges, or other components of the NoC.

The deserializer 308 may be configured to manage multiple VCs associated with the transport link/channel 307. The deserializer 308 may receive the header 305A and the payload 305B from one of the multiple VCs associated with the transport link/channel 307. The deserializer 308 may include at least one buffer associated with each of the VCs, which may be configured to receive and store the serialized flits for parallelization by the deserializer 308.

FIG. 4 illustrates an example representation 400 of multiple flits being transported through the NoC, in accordance with an example implementation.

In some embodiments, the serializer 306 may be configured to receive a plurality of flits that form the packet. The plurality of flits may include at least one flit indicative of the SOP and at least one other flit indicative of the end of packet (EOP). Each of the flits may include a header 305A (such as $H_1$, $H_2$, $H_3$), and payload 305B (such as $P_1$, $P_2$ and $P_3$). The headers $H_1$, $H_2$, $H_3$ may be received through header wires/links $H_w$. Similarly, the payload $P_1$, $P_2$ and $P_3$ may be received from wires/links $P_w$. The wires $H_w$ and $P_w$ may allow the headers and payload to be transported in parallel (i.e. $H_1$ and $P_1$ together in the first flit, $H_2$ and $P_2$ together in the second flit, and $H_3$ and $P_3$ together in the third flit) The flits may also include control information shared using control wires $C_w$. Control information may indicate whether a flit is a SOP or an EOP, or whether the payload is valid. In such embodiments, the serializer 306 may be configured to forwarding the header (such as $H_1$) associated with SOP/first flit on the link, and discard headers (such as $H_2$, $H_3$) of subsequent flits. The serializer 306 may transmit the header $H_1$ first, and subsequently the payload $P_1$, $P_2$ and $P_3$ through the transport link 307. The serializer 306 may continue forwarding payload flits (such as by transmitting the max of values received from the $H_w$ and $P_w$) until the EOP is received. In some embodiments, the deserializer 308 may be configured to receive the header $H_1$ of the SOP. On receiving the SOP header $H_1$, the deserializer 308 may store the header $H_1$ in a storage stage thereof. The deserializer 308 may be configured to send copies of the header $H_1$ stored in the storage, and pass each of the payload $P_1$, $P_2$ and $P_3$ with the header $H_1$ in parallel to the physical output channel, until EOP is transmitted from the deserializer 308 On transmitting the EOP, the header $H_1$ stored in the deserializer 308 may be discarded. In such embodiments, the deserializer 308, or the storage thereof, may become available to receive next set of serialized headers 305A and payloads 305B from the serializer 306.

In some examples, when the deserializer 308 receives the SOP header $H_1$, the deserializer 308 may enable a flag (such as by making a Boolean value equal to 1) to indicate storage of a copy of the header $H_1$. The deserializer 308 may forward copies of the header 305A with the payloads 305B received subsequent to the header 305A, until the EOP flit is received. On receiving the EOP flit, the deserializer 308 may disable the flag (such as by returning the Boolean value to 0).

In some embodiments, each VC may have at least one flag corresponding thereto. The flag may be used to track whether the SOP or the EOP associated with each packet has been received from the corresponding VC, thereby allowing packets, or serialized headers and payloads thereof, to be transmitted through the transport link 307. Maintaining multiple flags for the VCs may allow different route information/headers to be interleaved and transmitted through the transport link 307. The flags may also allow the deserializer 308 to appropriately deserialize the header with the corresponding payload flit, and eliminate requirement for an arbiter or implementing arbitration strategies to resolve contentions.

In some embodiments, the serializer 306 may be configured to return a link credit after the payload flit is forwarded. The link credit may allow the serializer 306 to receive and transmit flits in compliance with the NoC's flow control protocols, such as credit flow control between the end points of the link. In some embodiments, since the serializer 306 may be configured to resize and/or divide the flits received from the first router, the link credits may be used to account for said resizing and/or division. In some examples, if the packets have one or more 64-bit flits, and the serializer 306 is configured serialize the 64-bit flits into 32-bit flits to match the capacity of the transport link 307, and if the buffer in the serializer 306 is capable of handling 64 bits at a time, the serializer 306 may serialize the 64-bit flits into two 32-bit flits and the link credit may be returned to the first router when both the serialized 32-bit flits are cleared from the buffer of the serializer 306, such as when transmitted through the transport link/channel 307.

Further, any extra flits created by the serializer 306 may be parallelized by the deserializer 308 such that the number and sizes of the flits provided by the first router to the serializer 306 is equal to the number and sizes of flits deserialized by the deserializer 308. The embodiments disclosed herein, hence, eliminate the need for additional protocols to manage credits between the serializer 306 and/or the deserializer 308, and other components of the NoC.

In some preferred embodiments, the serializer 306 may be placed on the transport link 307 before the deserializer 308, thereby allowing header and payload of flits to be injected into and ejected out of the transport link 307 to arrive at the serializer in parallel. In other embodiments, only the serializer 306 may be placed on the transport link 307, where the NoC may allow the headers and payload of flits to be injected in parallel, passed through the NoC and ejected out of the NoC in serial. In further embodiments, only the deserializer 308 may be included in the transport link 307, where the headers and payload of flits may be injected and/or passed through the NoC in serial, and ejected out in parallel. In still further embodiments, the deserializer 308 may be placed before the serializer 306 on the transport link 307, where the flits may be injected into and ejected out of the transport link 307 in serial, but passed through the NoC in parallel.

Serialization allows for reduction in number of and capacity of links/channels/wires required for interconnection between routers, and/or processing elements, thereby reducing power consumption, area occupied, and overheads during transportation. Further, discarding the header 305A corresponding to each payload 305B for transmission may reduce the number of transmissions required to convey the data to the second router, thereby reducing latency. Additionally, when the NoC pertains to a large system where the route information consumes a significant amount of the space (such as 32 bits), the embodiments of the present disclosure may achieve significant savings in bandwidth since the route information in the header 305A may be transmitted once for all the payload 305B, as opposed to once for each of the payload 305B. In such implementations, bandwidth wastage due to redundant transmission of known header information through the transport link 307 may be eliminated.

While existing NoCs are configured to transmit packets in parallel, use of serial transport links may reduce requirement for converting the form of the packets for applications employing serial communication media, at a low cost.

Parts/portions of the fabric of the NoC may be configured to transmit packets serially, and other parts of the NoC may be configured to transmit the packets in parallel based on bandwidth or capacity required between those parts of the NoC, thereby reducing the costs of manufacturing. Serialization is also cheaper, simpler to implement, and has lower buffering costs compared to other solutions like width conversion of the flits.

Embodiments disclosed herein also allow for NoC to have heterogenous transport channels, since the serializer 306 and the deserializer 308 may allow for efficient conversion of the form of the packets during their transportation through the transport link 307. Additionally, the serializer 306 and the deserializer 308 may allow the packets to be dynamically serialized or deserialized based on the sizes of the header 305A and the payload 305B.

The serializer 306 and the deserializer 308 may be implemented in a plurality of arrangements/configurations. FIG. 5(*a*) illustrates an example 500A of an NoC implementing an end-to-end serialization mode/configuration/arrangement, and FIG. 5(*b*) illustrates an example 500B of a NOC implementing a per-hop serialization-deserialization mode/configuration/arrangement. As shown, the NoC may include bridges through which packets may be injected into or ejected out of the NoC. For example, ingress bridges $B_1$ and $B_2$ may allow the packets to be injected into the NoC from a component/processing element, and egress bridges $B_3$ and $B_4$ may eject the packet from the NoC to another component/processing element. Routers $R_1$ and $R_2$ may allow the packets to be transported from the ingress bridges to the egress bridges. Transport links/channels may allow transmission of flits between ingress bridges and routers, between two or more routers, and routers and egress bridges.

In the end-to-end serialization mode shown in FIG. 5(*a*), the serializers 306 may be associated with the transmitting/ingress bridges, and deserializers 308 may be associated with receiving/egress bridges. For example, each transmitting bridge $B_1$ and $B_2$ may have corresponding serializers 306-1 and 306-2, respectively. Further, each receiving bridge $B_3$ and $B_4$ may have corresponding deserializers 308-1 and 308-2, respectively. Packets may be injected into the NoC through ingress/transmitting bridges $B_1$ and $B_2$ may be serialized by serializers 306-1 and 306-2, and transported through the routers $R_1$ and $R_2$ in serial. The packets may be deserialized before or at the receiving/egress bridges $B_3$ and $B_4$ for ejection. Such configurations ensure that the packets are serialized during transmission through the NoC (such as from the ingress bridge, through the routers $R_1$ and $R_2$, and to the egress bridges), thereby requiring links/wires of lower widths which reduces the cost of the NoC.

In per-hop serialization-deserialization mode shown in FIG. 5(*b*), the packets may be serialized and deserialized at each hop/each transmission between two nodes such that the flits are serialized during transmission through links between the two nodes, but is deserialized/parallelized when received at the nodes. For each transport link/channel in the NoC, a serializer 306 is placed at a start of the transport link/channel and a deserializer 308 is placed at the end of the transport link/channel. For example, the packets injected into the ingress bridges $B_1$ and $B_2$ may be serialized by serializers 306-1 and 306-2, respectively. When/before the packet reaches router $R_1$, the packet may be deserialized by deserializers 308-1 and 308-2. Subsequently, the router $R_1$ may serialize the packet using serializer 306-3, and transport the serialized packet to the router $R_2$. When/before the packet reaches router $R_2$, the packet may be deserialized by deserializer 308-3. The router $R_2$ may then serialize the packet using serializers 306-4 and 306-5 for transmission of the packet to egress bridges $B_3$ and $B_4$ respectively. The packets may be deserialized by deserializers 308-4 and 308-5 before they are received by the egress bridge $B_3$ and $B_4$, respectively. In such implementations, the serializers 306 and the deserializers 308 are placed such that the packets are serialized before transmission through the transport links/channels between any two nodes, and deserialized before the packet is received by the node. Further, such implementations ensure that the flits are deserialized at the routers, thereby allowing for fine-grained control.

In some embodiments, portions of the NoC may implement end-to-end serialization mode, and other portions of the NoC may implement per-hop serialization-deserialization mode. In further embodiments, the serializers 306 may be placed between the bridges (such as the ingress bridges, for example) and the component injecting the packet thereinto. Similarly, the deserializers 308 may be placed between the bridges (such as the egress bridges, for example) and the component to which the packet is ejected. The aforementioned embodiments assume that the component/processing elements operate on packets where headers and payload are transported in parallel. However, it may be appreciated by those skilled in the art that the positions/configuration of the serializers 305 and the deserializers 308 may be suitably adapted for implementations where the components/processing elements operate on packets where the headers and payloads are in serial.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example embodiments, the steps carried out require physical manipulations of tangible quantities for achieving a tangible result.

Moreover, other implementations of the example embodiments will be apparent to those skilled in the art from consideration of the specification and practice of the example embodiments disclosed herein. Various aspects and/or components of the described example embodiments may be used singly or in any combination. It is intended that the specification and examples be considered as examples, with a true scope and spirit of the embodiments being indicated by the following claims.

What is claimed is:

1. A Network on Chip (NoC), comprising:

a serializer connected to a transport link/channel of the NoC, configured to:

receive a packet comprising a plurality of flits, each of the plurality of flits composed of a header and a payload;

forward the header of a first flit of the plurality of flits to the transport link/channel; and forward the payload of each of the plurality of flits to the transport link/channel after the header is forwarded;

and a deserializer connected to the transport link/channel of the NoC, configured to:

receive the forwarded header and the payload of the each of the plurality of flits in a serialized manner from the transport link/channel;

store the forwarded header; and for each forwarded payload of the each of the plurality of flits, send a corresponding flit comprising a copy of the stored and forwarded header and the each forwarded payload.

2. The NoC of claim 1, wherein the deserializer is configured to manage multiple virtual channels associated with the transport link/channel and receive the header and the payload from one of the multiple virtual channels associated with the transport link/channel.

3. The NoC of claim 1, wherein the deserializer is configured to:

send the corresponding flit for the each of the plurality of flits until an end of packet is received; and discard the stored and forwarded header when the end of packet is received.

4. The NoC of claim 1, wherein the deserializer is configured to store the forwarded header in a storage stage for sending the copies on receipt of a start of packet.

5. The NoC of claim 1, wherein the serializer manages multiple virtual channels associated with the transport link/channel and is configured to forward the header and the payload to one of the multiple virtual channels associated with the transport link/channel.

6. The NoC of claim 1, wherein the serializer is connected to a source router or a bridge of the NoC.

7. The NoC of claim 1, wherein the serializer is configured to forward the header to the transport/link channel through prioritizing header portions of the flit containing a start of packet.

8. The NoC of claim 1, wherein the serializer is configured to forward the header to the transport link/channel by forwarding multiple portions of the full header sequentially to the transport link/channel.

9. The NoC of claim 1, wherein the serializer is configured to return a link credit after the header portion in SOP flit is serialized on to the link and forwarded.

10. The NoC of claim 1, wherein the serializer is placed at a transmitting bridge, and the deserializer is placed at a receiving bridge.

11. The NoC of claim 1, wherein the serializer is placed at a start of the transport link/channel and the deserializer is placed at the end of the transport link/channel.

12. A Network on Chip (NoC), comprising:

a deserializer connected to a transport link/channel of the NoC, configured to:

receive a header of a first flit of a plurality of flits of a packet and a payload of the each of the plurality of flits in a serialized manner from the transport link/channel;

store the header of the first flit of the plurality of flits; and send, for each of the plurality of flits, a corresponding flit comprising a copy of the stored header of the first flit of the plurality of flits and the payload of the each of the plurality of flits.

13. The NoC of claim 12, wherein the deserializer is configured to store the header in a storage stage for sending the copies on receipt of a start of packet.

14. The NoC of claim 12, wherein the deserializer is configured to:

send the corresponding flit for the each of the plurality of flits until an end of packet is received; and discard the stored header when the end of packet is received.

15. The NoC of claim 12, wherein the deserializer is configured to manage multiple virtual channels associated with the transport link/channel and receive the header and the payload from one of the multiple virtual channels associated with the transport link/channel.

16. The NoC of claim 12, further comprising:

a serializer connected to the transport link/channel of the NoC, configured to:

receive the corresponding flit composed of the header of the first flit of the plurality of flits and the payload of the each of the plurality of flits;

forward the header to the transport link/channel; and forward the payload to the transport link/channel after the header is popped.

17. The NoC of claim 12, wherein a serializer receives the header and the payload from a physical output channel or the deserializer.

* * * * *